A. J. CAYWOOD.
Improvement in Device for Mending Broken Spokes in Vehicle-Wheels.
No. 128,535. Patented July 2, 1872.
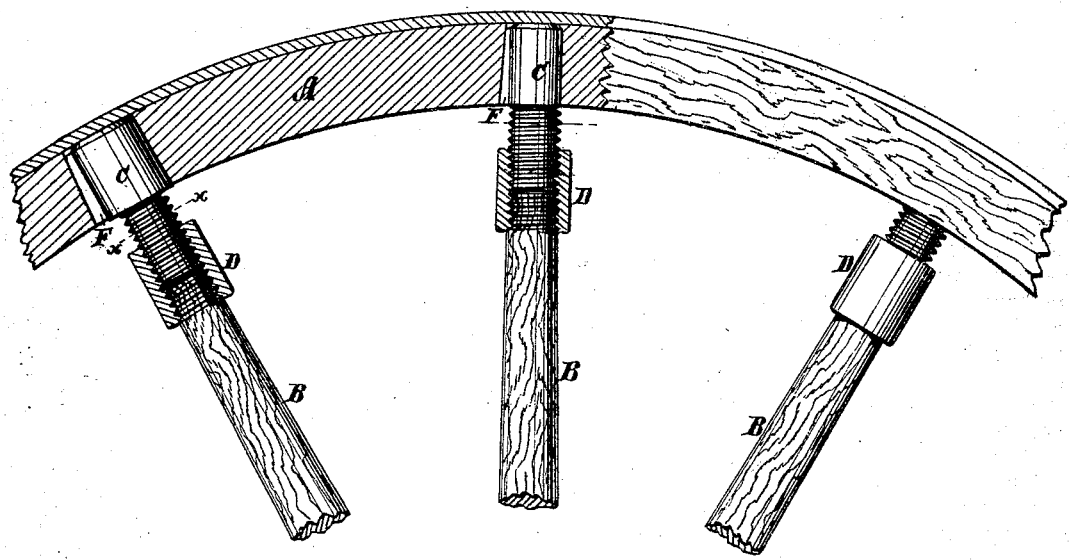

UNITED STATES PATENT OFFICE.

ANDREW J. CAYWOOD, OF POUGHKEEPSIE, NEW YORK.

IMPROVEMENT IN DEVICES FOR MENDING BROKEN SPOKES IN VEHICLE WHEELS.

Specification forming part of Letters Patent No. 128,535, dated July 2, 1872.

Specification describing a new and Improved Device for Mending Broken Spokes, invented by ANDREW J. CAYWOOD, of Poughkeepsie, in the county of Dutchess and State of New York.

My invention relates to mending broken spokes of wheels of vehicles by means of a screw-threaded sleeve applied to the reduced threaded end of such spokes and to the adjacent ends of metal rods or tubes, which are let into the felly, as hereinafter described.

Figure 1 is partly a side elevation and partly a sectional elevation of a wheel having the spokes mended with my improved device. Fig. 2 is a cross-section on the line $x\ x$ of Fig. 1.

Similar letters of reference indicate corresponding parts.

A represents the felly or rim of a wheel, and B some of the spokes, which latter frequently break off close to the felly, and are of no further use unless repaired, but are very objectionable on account of the rattling noise they make. Now, I propose to repair such broken spokes in a very simple and efficient manner by first cutting off the ends about an inch, (more or less,) then removing the broken tenon from the hole in the felly, and inserting a metal rod or tube, C, with the long ferrule or sleeve D screwed on it up to the inside of the felly or thereabout, the said rod or tube C being long enough to butt against the end of the spokes when the latter, which is sprung out one side to allow of boring out the broken tenon and inserting the metal piece C, is brought back into line with the latter; but before so adjusting the spoke I dress off the end, if too large, with a hollow auger or the like, so that the ferrule D will screw on it snugly, its thread cutting or admitting the wood at the same time so as to bind and hold securely, and thus I splice out the broken spokes without removing or loosening the tire or fellies. I take care, in cutting off the spoke, to have it long enough to press the piece C strongly against the tire and felly, so as to spring them out and bind them firmly together. I also have a rib-key or flange, F, on the side of the part of the piece C which enters the felly, to prevent the said piece from turning with the ferrule D, and previous to putting said piece C in the hole I cut a channel-way down outside of the hole for said rib.

The piece C may be one uniform diameter throughout its length; or the part entering the wood may be larger or smaller than the other part, according to circumstances; but the screw-thread part should be about the size of the end of the spoke so that the ferrule D will screw on without much dressing of the spoke.

A good way to make the piece C, when the part which enters the wood is to be smaller than the other part, would be to have a small piece of tube lightly fitted in the hole of a larger one, which latter would be screw-threaded for the ferrule and fit against the end of the spoke, while the smaller part would fit in the hole of the felly.

When the extension is made of tubing it is necessary to place on the head of the spoke a disk of iron the shape of a coin, which would rest against the end of the small tube. The sleeve, screwing down over it, holds it to its place and provides a firm bearing for the end of the spoke; but other modes of constructing said piece may be adopted.

I am aware of the use of a threaded sleeve and threaded screw rod or stem in construction of carriage-wheels; but the same are not applicable in place of the devices I employ.

Having thus described my device, I claim as new and desire to secure by Letters Patent—

The short detachable screw-rod C, provided with the rib F, and the sleeve D, threaded internally throughout its length and applied to the adjacent and abutting ends of the said rod and spoke, as specified.

ANDREW J. CAYWOOD.

Witnesses:
   T. B. MOSHER,
   W. A. GRAHAM.